(12) United States Patent
Sawada

(10) Patent No.: US 7,158,271 B2
(45) Date of Patent: Jan. 2, 2007

(54) IMAGE PROCESSING APPARATUS

(75) Inventor: Takayuki Sawada, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1013 days.

(21) Appl. No.: 10/143,699

(22) Filed: May 13, 2002

(65) Prior Publication Data
US 2003/0210411 A1 Nov. 13, 2003

(51) Int. Cl.
H04N 1/46 (2006.01)
(52) U.S. Cl. .................. 358/505; 358/515; 358/517
(58) Field of Classification Search ............ 358/474, 358/505, 515, 513, 517, 518, 520, 521, 529, 358/537
See application file for complete search history.

(56) References Cited

U.S. PATENT DOCUMENTS 5,452,017 A * 9/1995 Hickman ............... 348/646
5,615,320 A * 3/1997 Lavendel ............... 345/594
6,325,482 B1 * 12/2001 Hayasaki et al. .......... 347/19
6,825,941 B1 * 11/2004 Nguyen et al. ........... 358/1.15
2002/0176621 A1 * 11/2002 Zhang et al. ............ 382/165
2003/0072015 A1 * 4/2003 Fujino ................. 358/1.9
2003/0210411 A1 * 11/2003 Sawada ................ 358/1.9

FOREIGN PATENT DOCUMENTS

JP 402170673 A * 7/1990
JP 11-355585 12/1999

OTHER PUBLICATIONS

U.S. Appl. No. 09/367,694, filed Aug. 19, 1999, Kanno et al.

* cited by examiner

Primary Examiner—Jerome Grant, II
(74) Attorney, Agent, or Firm—Foley & Lardner LLP

(57) ABSTRACT

R, G and B signals read by a 4-line color CCD sensor are converted into C, M and Y color signals. A black-and-white signal is generated from a luminance signal read by the 4-line color CCD sensor. Densities of the C, M and Y color signals are converted on the basis of the black-and-white signal.

9 Claims, 10 Drawing Sheets

F I G. 24     F I G. 25
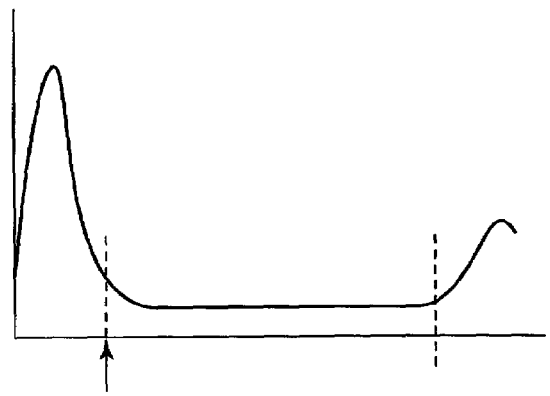
F I G. 26    Background lower limit threshold
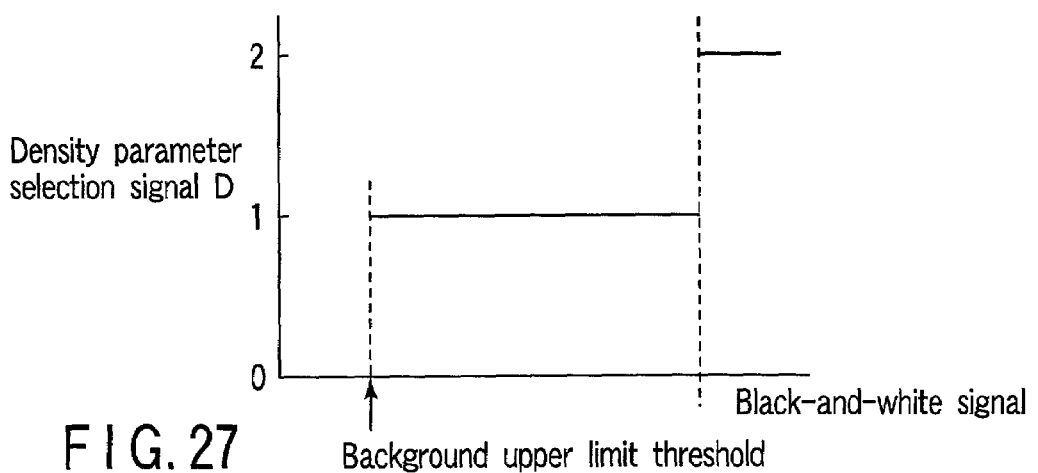
F I G. 27    Background upper limit threshold

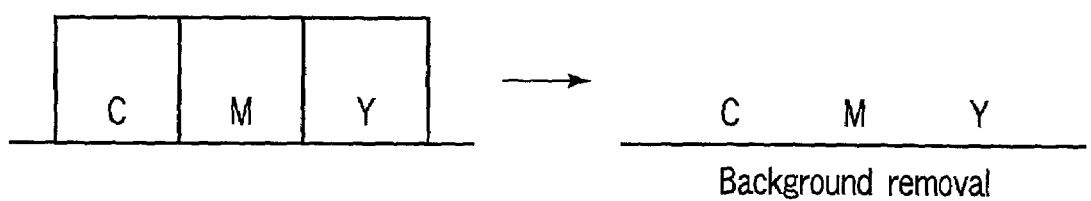
FIG. 28
FIG. 30
Background removal
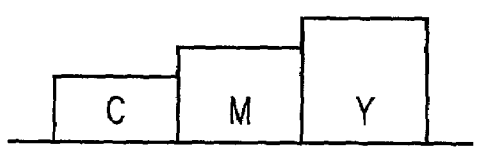
FIG. 29
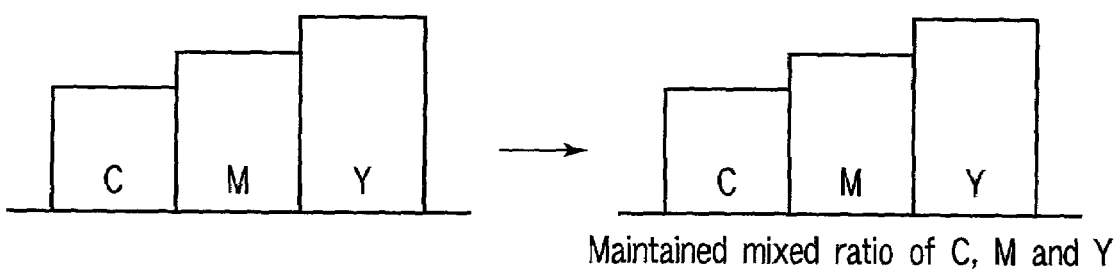
FIG. 31
FIG. 32
Maintained mixed ratio of C, M and Y

IMAGE PROCESSING APPARATUS

BACKGROUND OF THE INVENTION

The present invention relates to an image processing apparatus for performing image processing for an input color image in a digital color copying machine that reads a color image in an original document and forms a reproduced image thereof.

In a color copying machine, a color image in an original document is color-separated and read by a color line CCD sensor or the like. Then, the read image is converted into a color material signal, such as that for a color toner or a blacking, and printed. This conversion is referred to herein as color conversion.

In the color conversion, by performing a predetermined computation for color separation signals R (red), G (green) and B (blue) of the color image, these color separation signals are converted into color material signals C (cyan), M (magenta) and Y (yellow).

In order to perform an automatic background removal of C, M and Y signals, there has been conventionally used a method in which a background upper limit threshold is detected from a histogram of each color and a density conversion curve is defined for each color.

In accordance with such a method, however, as the processing is independently performed for each color, there arises a problem in that a color that is assumed as the background and that has decreased density and a color with its density not being decreased exist at the same time, and a hue is improperly varied.

Further, image processing having higher resolution than that of gray signal value processing, blacking processing, blacking substitution processing and the like is required.

BRIEF SUMMARY OF THE INVENTION

An object of the present invention is to provide an image processing apparatus in which background removal can be appropriately performed, hue can be maintained even if the background removal is not performed and image processing can be carried out with high resolution.

In order to accomplish the aforementioned object, the present invention provides an image processing apparatus which processes a plurality of image signals input from an image reading apparatus for reading an image of an original document, the image reading apparatus comprising a first image reading section formed of a plurality of line CCD sensors with different color characteristics and a second image reading section formed of a single or a plurality of line CCD sensors, said image processing apparatus comprising: a color conversion section which converts a first image signal read in the first image reading section and represented by a first color space into a second image signal represented by a second color space; a generating section which generates a fourth image signal from a third image signal read at the second image reading section; a determining section which determines whether or not each of the pixels has low saturation color with respect to the first image signal read in the first image reading section; a selecting section which selects the fourth image signal generated at the generating section when it is determined as low-saturation color and which selects the second image signal converted at the color conversion section when it is determined as not low saturation; and an image processing section which performs image processing for the fourth or the second image signal selected at the selecting section.

Further, the present invention provides an image processing apparatus which comprises a first image reading section formed of a plurality of line CCD sensors with different color characteristics and a second image reading section formed of a single or a plurality of line CCD sensors and which processes a plurality of image signals input from an image reading apparatus for reading an image of an original document, the image processing apparatus comprising: a color conversion section which converts a first image signal read in the first image reading section and represented by a first color space into a second image signal represented by a second color space; a generating section which generates a fourth image signal from a third image signal read at the second image reading section; and a density conversion section which converts a density of the second image signal converted at the color conversion section on the basis of the fourth image signal generated at the generating section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 24 is a view showing C, M and Y color signals;

FIG. 25 is a view showing a mixed ratio of C, M and Y;

FIG. 26 is a view showing a histogram for a black-and-white signal;

FIG. 27 is a view for explaining background determination;

FIG. 28 is a view showing the C, M and Y color signals;

FIG. 29 is a view showing the C, M and Y color signals;

FIG. 30 is a view for explaining the background removal;

FIG. 31 is a view showing the C, M and Y color signals; and

FIG. 32 is a view showing the mixed ratio of C, M and Y being maintained.

DETAILED DESCRIPTION OF THE INVENTION

An embodiment of the present invention will be described hereinafter with reference to the drawings.

Figure 1:
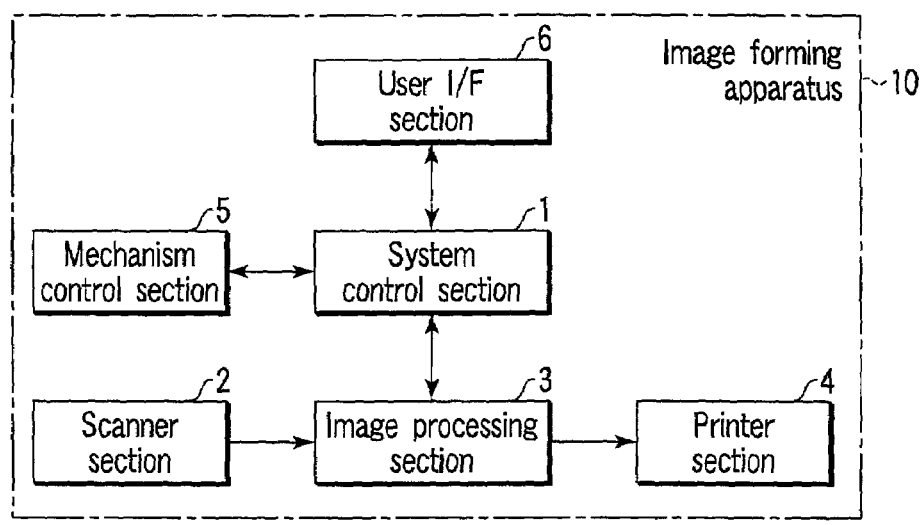
FIG. 1 is a view showing a schematic structure of an image forming apparatus according to an image processing apparatus of the present invention.

FIG. 1 shows a schematic structure of an image forming apparatus 10 according to an image processing apparatus of the present invention.

The image forming apparatus 10 is configured by a system control section 1, a scanner section 2, an image processing section 3, a printer section 4, a mechanism control section 5 and a user interface section 6.

The system control section 1 controls the whole system.

At the scanner section 2, an original document is scanned while being irradiated with light from a light source, and reflected light from the original document is read by a 4-line color CCD sensor to be described later.

At the image processing section 3, various types of processing including γ correction, color conversion, main scanning magnification-changing, image separation, manipulation, area processing and gradation correction processing are performed for image data read in the scanner section 2.

The printer section 4 forms an image on the basis of the image data from the image processing section 3.

The mechanism control section 5 controls mechanisms of units constituting the apparatus of the present invention.

The user interface section 6 displays a screen for a user to input and set operational settings of the apparatus of the present invention.

Figure 2:
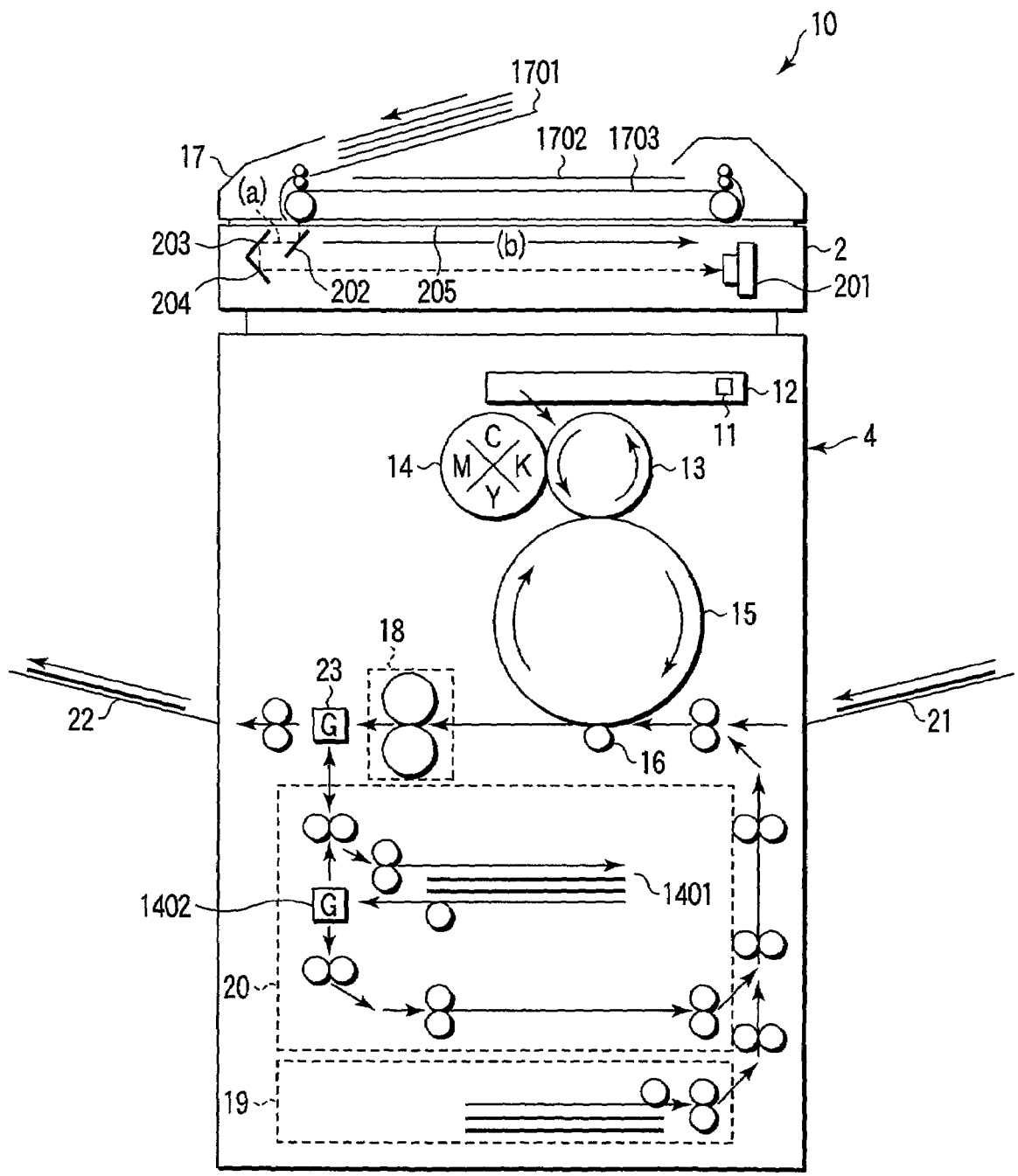
FIG. 2 is a schematic view showing an internal structure of the image forming apparatus.

FIG. 2 shows a schematic internal structure of the image forming apparatus 10. The image forming apparatus 10 is formed of the scanner section 2 and the printer section 4.

A document mount (document reading mount) 205 which is formed by a transparent glass on which an object to be read, i.e., an original document, is placed is provided at an upper surface of the scanner section 2. An automatic document feeder (ADF) 17 which automatically feeds the original document onto the document mount 205 is disposed at the upper surface of the scanner section 2. The automatic document feeder 17 is disposed so as to open and close with respect to the document mount 205, and also serves as an original cover for making the original document placed on the document mount 205 closely contact the document mount 205.

The scanner section 2 comprises a 4-line color CCD sensor 201 which reads an original document image on a line-by-line basis for each of R (red), G (green), B (blue) and Y (black-and-white), a first mirror 202, a second mirror 203 and a third mirror 204 that guide the line image on the original document to the 4-line color CCD sensor 201, the document mount 205 and a light source (not shown) which is disposed in the vicinity of the first mirror and used to obtain reflection light of read line of the original document.

The printer section 4 comprises an image writing section 12 including a laser diode (LD) 11, a photosensitive drum 13, a development section 14 for attaching toners of various colors to make an image, an intermediate transfer section 15 for retransferring the image formed on the photosensitive drum 13 on a transfer belt, a transfer section 16 for transferring the image formed on the photosensitive drum 13 to a transfer sheet, a fixing section 18 for performing heat fixing by a fixing roller and a pressure roller, a feed section 19 for feeding a transfer sheet, an FIFO automatic duplex unit (ADU) 20, a manual feed section 21, a discharge section 22 and a conveyance path switching gate 23.

The automatic document feeder 17 is formed by a document mount 1701, a document discharge mount 1702 and a document feed belt 1703. An original document is set on the document mount 1701. Then, the original document placed on the document mount 1701 is automatically fed or discharged by the document feed belt 1703. At the time of discharge, the original document is discharged onto the document discharge mount 1702.

An image forming operation of the image forming apparatus 10 with such structure will be described with reference to FIGS. 1 and 2.

The system control section 1 controls the whole image forming apparatus 10.

Firstly, at the scanner section 2, an original document is scanned while being irradiated with light by an unillustrated light source. Then, reflected light from the original document is received by the 4-line color CCD sensor 201, and image data of the original document is sent to the image processing section 3.

At the image processing section 3, image processing including γ correction, color conversion, main scanning magnification-changing, image separation, manipulation, area processing and gradation correction processing are performed upon the sent image data, and the resultant image data is sent to the printer section 4.

At the printer section 4, the LD 11 is driven and modulated depending on the sent image data.

A latent image is written onto the photosensitive drum 13 which has been evenly charged by laser beams from the LD 11. At the development section 14, toners are attached to the latent image and the latent image becomes an image.

The image formed on the photosensitive drum 13 is retransferred onto an intermediate transfer belt of the intermediate transfer section 15. In the case of full-color copying, toners of four colors (i.e., black, cyan, magenta and yellow) are successively placed on the intermediate transfer belt of the intermediate transfer section 15.

In the case of full-color, when the steps of forming four color images and transferring the images are completed, a sheet is fed from the feed section 19 (or the manual feed tray 21) at a timing which is synchronized with the intermediate transfer belt of the intermediate transfer section 15. Then, at the transfer section 16, the four color toners are transferred at the same time from the intermediate transfer belt of the intermediate transfer section 15 to the sheet.

In the case of single-color copy, a single color (i.e., black) toner is transferred from the photosensitive drum 13 to the transfer belt. As in the case of full-color, when steps of forming an image and of transferring the image are completed, a sheet is fed from the feed section 19 (or the manual feed tray 21) at a timing which is synchronized with the intermediate transfer belt of the intermediate transfer section 15. Then, at the transfer section 16, the toner is transferred from the intermediate transfer belt of the intermediate transfer section 15 to the sheet.

The transfer sheet with the toners being transferred thereto is fed through a conveyance path to the fixing section 18. At the fixing section 18, the transfer sheet is heat-fixed by the fix roller and the pressure roller, and the resultant sheet is discharged to the discharge section 22.

Setting by a user such as a copy mode or the like is input from the user interface section 6. The set operational mode such as copy mode is sent to the system control section 1.

The system control section 1 performs a control processing for carrying out the set copy mode. At this time, the system control section 1 instructs control for the scanner section 2, the image processing section 3, the printer section 4, the mechanism control section 5, the user interface section 6 and the like. Further, as shown in FIG. 1, the system control section 1 also instructs control for the FIFO automatic duplex device 20, the automatic document feeder 17 and the like.

Next, an operation of the FIFO automatic duplex unit (which hereinafter is referred to as ADU) 20 will be described with reference to FIG. 1. The ADU 20 in the apparatus of the present invention has three functions as follows.

In the first function, a fixed sheet with its printed surface facing upward (which hereinafter is referred to as face-up) is inverted in order to be discharged with its printed surface facing downward (which hereinafter is referred to as face-down).

Namely, a transfer sheet which is subjected to fixing processing in the fixing section 18 is conveyed to the ADU 20 by the conveyance path switching gate 23. A conveyance direction is inverted immediately after the trailing edge of the sheet passes through the switching gate 23, and the sheet is discharged to the discharge section 22. At this time, the transfer sheet is not stacked in a FIFO stack 1401. Such face-down discharge is required for making a printed surface (i.e., transferred surface) of the transfer sheet coincide its output order in a case of successively processing an original document from the first page.

In accordance with the second function, the fixed printed surface is inverted and the inverted sheet is stacked in the ADU 20. Then, the transfer sheet is output at an appropriate discharge timing in the order of being stacked, and then face-down-discharged.

Namely, a sheet subjected to the fixing processing at the fixing section 18 is conveyed to the ADU 20 by the conveyance path switching gate 23, and stacked in the FIFO stack 1401. The transfer sheet is output from the FIFO stack 1401 at an appropriate discharge timing in the order of being stacked (i.e., from the bottom sheet of the stack). Then, the output sheet passes through conveyance path switching gates 1402 and 23 and is face-down-discharged in the discharge section 22.

In the present invention, this operation is for, when a transfer sheet which has been printed prior to its original discharge order is temporarily withdrawn in the FIFO stack and is discharged from the FIFO stack at the original discharge timing, outputting the transfer sheet from the FIFO stack to discharge.

In accordance with the third function, a printed surface of the transfer sheet is inverted in order to perform automatically duplex printing and the transfer sheet is circulated again within the transfer section.

A transfer sheet which is fixed in the fixing section 18 is conveyed to the ADU by the conveyance path switching gate 23, and stacked in the FIFO stack 1401. The transfer sheet is output immediately after being stacked in the FIFO stack 1401, conveyed to a feed conveyance path by the conveyance path switching gate 1402 and fed again to the transfer section 16. At the transfer section 16, an image is transferred onto a rear surface (i.e., non-transferred surface) of the transfer sheet. The transfer sheet with the image transferred to its rear surface is fixed in the fixing section 18 and discharged to the discharge section 22.

An operation for adjusting a feed order according to the present invention may be carried out by using, instead of the FIFO stack, a circulation path used for duplex printing as a stack. Here, the circulation path must hold the required number of sheets.

When the circulation path is used, the FIFO stack is not needed (a return mechanism for inversion is needed) and thus the mechanism is simplified. Nevertheless, a time loss for the transfer sheet to pass through again the transfer section and the fixing section is generated.

Next, an image reading operation to be performed at the scanner section 2 by using the automatic document feeder 17 (which hereinafter is referred to as ADF) will be described with reference to FIG. 2.

The scanner section 2 corresponds to sheet-through reading that a reading position of the 4-line color CCD sensor 201 is fixed and an original document is moved such that an entire surface of the original document is read. Further, the scanner section 2 also corresponds to flat-bed reading that the entire surface of the original document is read by moving the reading position of the 4-line color CCD sensor 201.

At a time of sheet-through reading, the mirrors 202, 203 and 204 are disposed such that an original document image on a fixed position (a) on the document mount 205 is read. The entire surface of the original document is read by the original document placed on the document mount 1701 being conveyed to the document mount 205.

In the case of flat-bed reading, when the original document on the document mount 1701 has been conveyed on the document mount 205, the entire surface of the original document is read by the mirrors 202, 203 and 204 being moved along the document mount 205 (which is indicated by (b)).

In cases of the sheet-through reading and the flat-bed reading, the mirrors 202, 203 and 204 are disposed such that an optical path length required for reflection light of the original document image placed at the original document reading position to reach the 4-line color CCD sensor 201 is constant. In particular, when the reading position of the 4-line color CCD sensor 201 is moved at a time of flat-bed reading, the mirrors 202, 203 and 204 are relatively moved such that the optical path length is constant.

Figure 3:
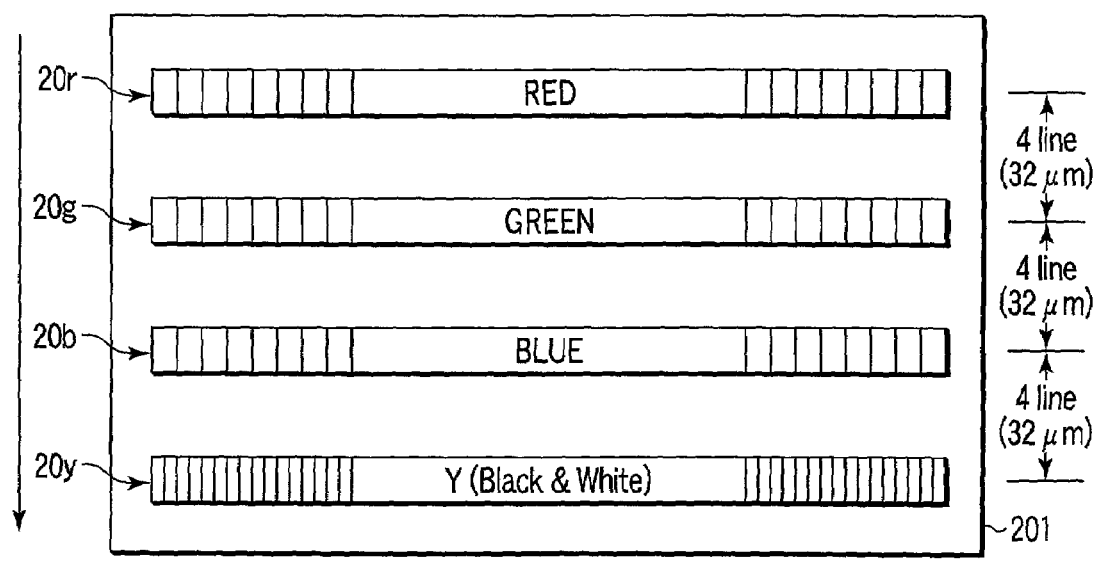
FIG. 3 is a view showing a schematic structure of 4-line color CCD sensor.

FIG. 3 shows a schematic structure of the 4-line color CCD sensor 201.

The 4-line color CCD sensor 201 has line sensors corresponding to 4 colors (i.e., Y: black-and-white, R: red, G: green and B: blue).

The 4-line color CCD sensor 201 is formed by a Y (black-and-white) sensor 20y which is a high resolution luminance sensor, an R sensor 20r, a G sensor 20g and a B sensor 20b that have a low resolution.

Intervals each of which being 32 μm are formed between the line sensors of the respective colors. Each interval corresponds to 4 lines when converted into the number of pixels of the sensor.

When an original document image is read at equal magnification, images obtained by the line sensors of the respective colors reading the original document image are shifted by 4 lines. Thus, in order to obtain the image information of the same line on the original document image, deviation of line must be corrected in the data.

If the order of reading the same line on the original document image is Y, B, G and R, in order to obtain the image data of the same line as that of the image being read by R, the G image is delayed by 4 lines, the B image is delayed by 8 lines and the Y image is delayed by 12 lines.

If a movement speed of the reading position is decreased to ¼ to obtain an enlarged image with a magnification of 400%, the G image must be delayed by 16 lines, the B image must be delayed by 32 lines, and the Y image must be delayed by 48 lines. In contrast, if the movement speed is increased twice to obtain a reduced image with the magnification of 50%, the G image must be delayed by 2 lines, the B image must be delayed by 4 lines and the Y image must be delayed by 6 lines.

Figure 4:
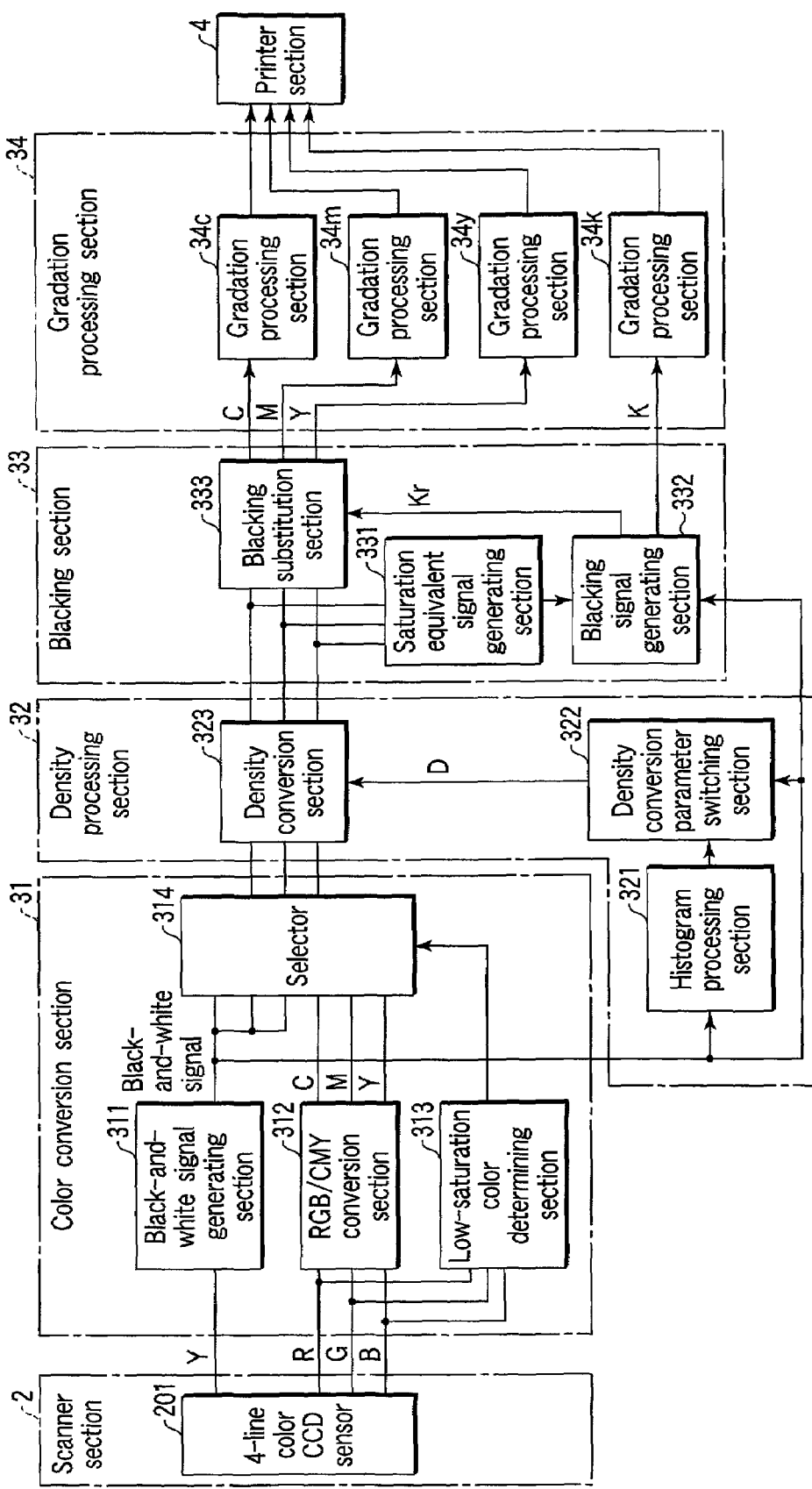
FIG. 4 is a block diagram showing an image processing structure of the image forming apparatus utilizing the 4-line color CCD sensor.

FIG. 4 shows a structure of data processing block in the image forming apparatus utilizing the 4-line color CCD sensor 201.

As shown in FIG. 4, the image forming apparatus 10 is configured by the 4-line color CCD sensor 201 for reading an original document image and converting the read image into an electric signal, a color conversion section 31, a density processing section 32, a blacking section 33, a gradation processing section 34 and the printer 4.

The image processing section 3 is configured by the color conversion section 31, the density processing section 32, the blacking section 33 and the gradation processing section 34.

The color conversion section 31 is formed by a black-and-white signal generating section 311, an RGB/CMY conversion section 312, a low saturation color determining section 313 and a selector 314.

The density processing section 32 is formed by a histogram processing section 321, a density conversion parameter switching section 322 and a density conversion section 323.

The blacking section 33 is formed by a saturation equivalent signal generating section 331, a blacking signal generating section 332 and a blacking substitution section 333.

The gradation processing section 34 is formed by four gradation processing sections 34c, 34m, 34y and 34k.

Next, an image processing of the present invention in such structure will be described.

At the scanner section 2, a high resolution luminance signal Y and low resolution R, G and B signals are output from the 4-line color CCD sensor 201.

The luminance signal Y is converted into a polar black-and-white signal with the white of 0 and the black of the maximum vale by the black-and-white signal generating section 311.

Figure 5:
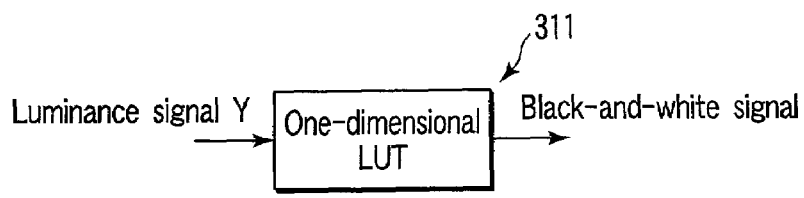
FIG. 5 is a view showing a structure of a black-and-white signal generating section.

FIG. 5 shows a structure of the black-and-white signal generating section 311. As shown in FIG. 4, a black-and-white signal is read out from an one-dimensional lookup table with an input of the luminance signal Y being an address.

The RGB/CMY conversion section 312 converts R, G and B signals into C, M and Y color signals, respectively. The RGB/CMY conversion section 312 may be implemented by a matrix computation or a method in which correlation is performed by referring a three-dimensional lookup table that upper bits of the R, G, B signals are an address.

Figure 6:
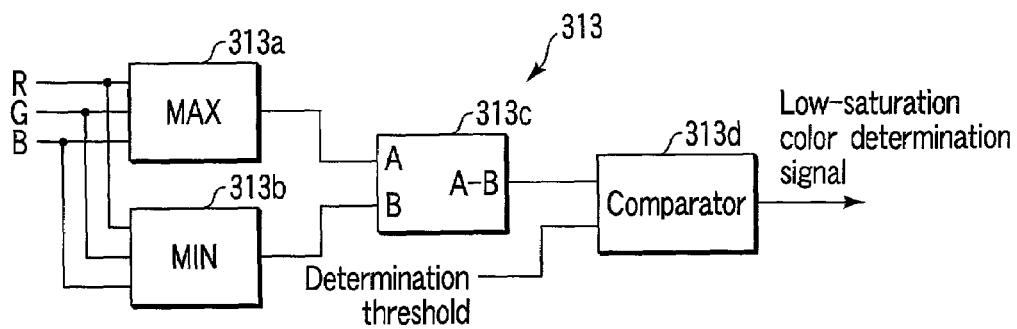
FIG. 6 is a view showing a structure of a low saturation color determining section.

FIG. 6 shows a structure of the low saturation color determining section 313. The low saturation color determining section 313 is formed by a maximum value detector 313a, a minimum value detector 313b, a subtracter 313c and a comparator 313d.

In accordance with the present embodiment, a difference between the maximum value of the R, G and B signals and the minimum value thereof is compared to a determination threshold set in advance. If the difference is smaller than the determination threshold, it is determined as low saturation, and a low saturation color determination signal is output as a result of determination. The determination threshold is set by the system control section 1.

The selector 314 selects, on the basis of the low saturation color determination signal outputted from the low saturation color determining section 313, one of C, M, Y color signal output from the RGB/CMY conversion section 312 and the black-and-white signal output from the black-and-white signal generating section 311, and outputs selected one.

When the low saturation color determination signal has a value indicating "not low saturation", the C, M, Y color signal is selected and output. When the low saturation color determination signal has a value indicating "low saturation", the black-and-white signal is selected and output.

At the histogram processing section 321 of the density processing section 32, a histogram for black-and-white signal is generated from the black-and-white signal obtained by pre-scanning.

Figure 7:
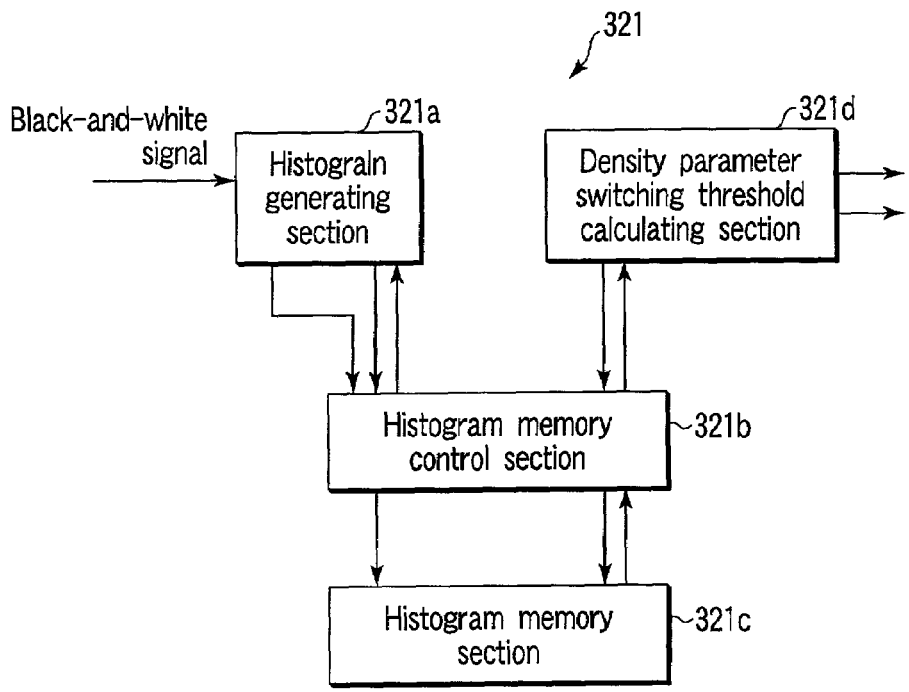
FIG. 7 is a view showing a structure of a histogram processing section.

FIG. 7 shows a structure of the histogram processing section 321. The histogram processing section 321 is formed by a histogram generating section 321a, a histogram memory control section 321b, a histogram memory section 321c and a density parameter switching threshold calculating section 321d.

The histogram generating section 321a shown in FIG. 7 counts the frequency of signal values of the black-and-white signal output from the black-and-white signal generating section 311, and stores the counted frequency in the histogram memory section 321c. As a result, a histogram for a black-and-white signal is generated.

Figure 8:
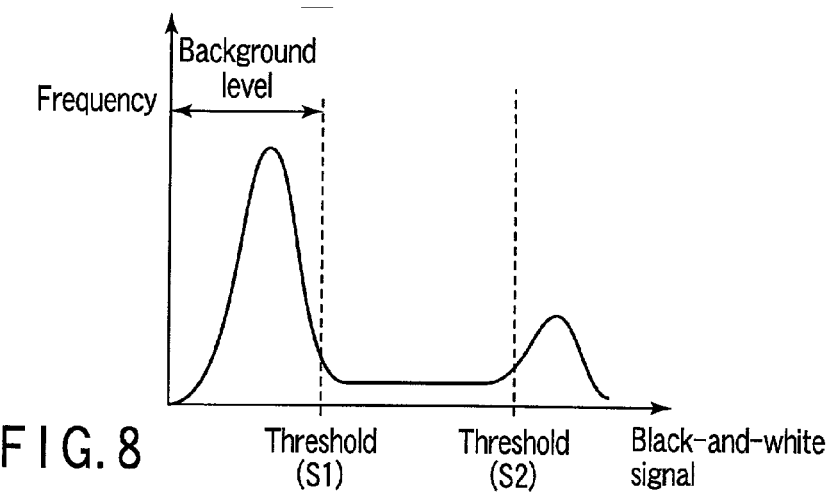
FIG. 8 is a view showing an example of histogram for the black-and-white signal.

FIG. 8 shows an example of the histogram for a black-and-white signal. A vertical axis indicates the frequency and a horizontal axis indicates a signal value.

The density parameter switching threshold detecting section 321d detects a background level upper limit threshold (S1) and a black character level lower limit threshold (S2) shown in FIG. 8, and supplies these values to the density conversion parameter switching section 322.

Figure 9:
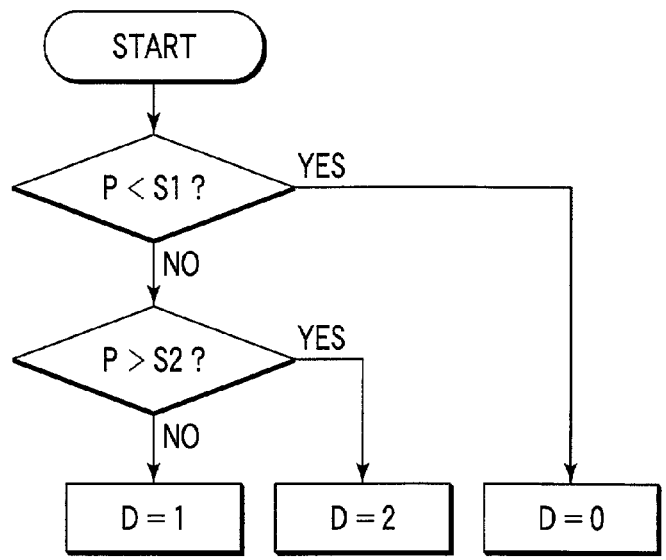
FIG. 9 is a flowchart for explaining an operation of a density conversion parameter switching section.

An operation of the density conversion parameter switching section 322 is shown in a flowchart of FIG. 9. The density conversion parameter switching section 322 compares a black-and-white signal (p) to be input at a time of main scanning to two thresholds S1 and S2. Then, depending on the result, a density parameter selection signal value D is determined as follows. If p<S1, D=0. If S1≦p≦S2, D=1, and if S2<p, D=2. The D value determined in the density conversion parameter switching section 322 is passed to the density conversion section 323.

Figure 10:
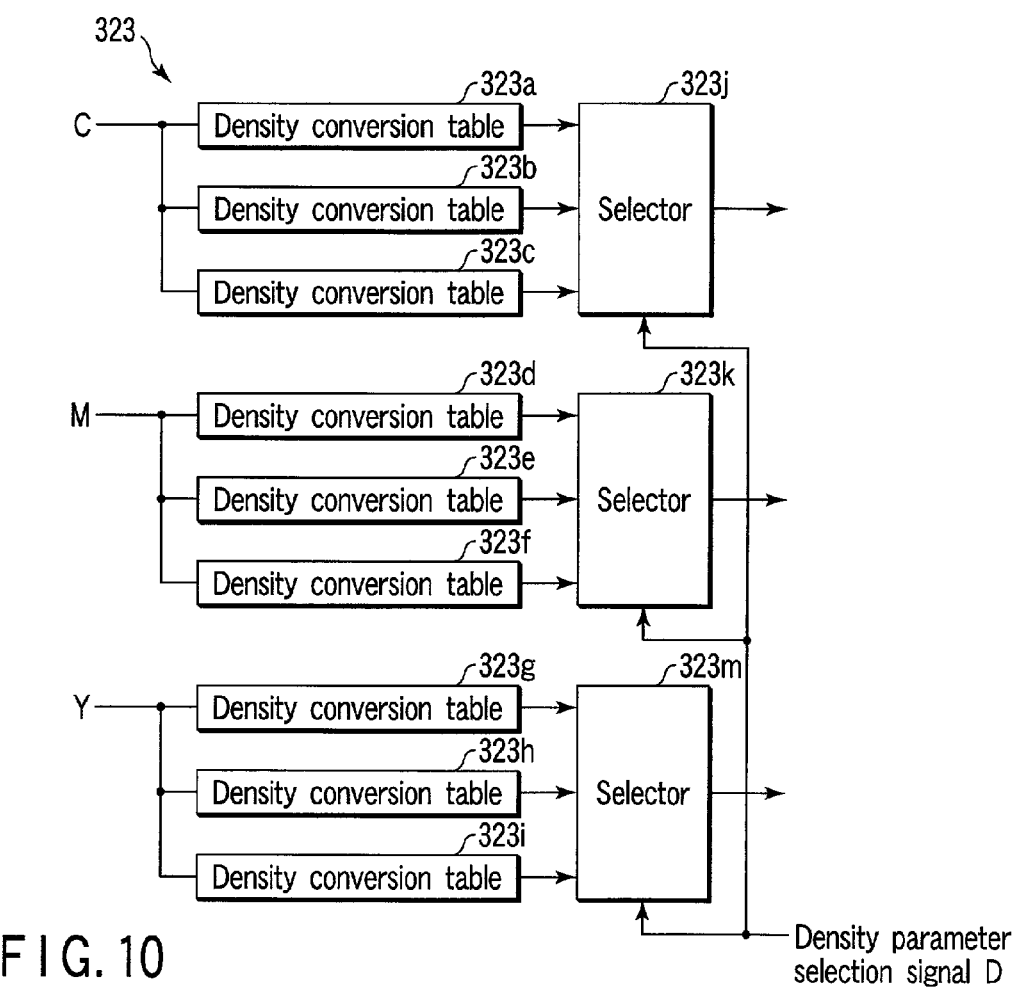
FIG. 10 is a view showing a structure of a density conversion section.

FIG. 10 shows a structure of the density conversion section 323. The density conversion section 323 is formed by nine density conversion tables 323a to 323i and three selectors 323j, 323k and 323m.

The density conversion section 323 converts C, M and Y color signals output from the selector 314 of the color conversion section 31 by using three types of density conversion tables (323a to 323c, 323d to 323f and 323g to 323i).

The selector 323j selects, depending on the density parameter selection signal D, one of three types of the density conversion tables 323a, 323b and 323c that converted the C color signal and outputs the selected table.

The selector 323k selects, depending on the density parameter selection signal D, one of three types of the density conversion tables 323d, 323e and 323f that converted the M color signal and outputs the selected table.

The selector 323m selects, depending on the density parameter selection signal D, one of three types of the density conversion tables 323g, 323h and 323i that converted the Y color signal and outputs the selected table.

Figure 11:
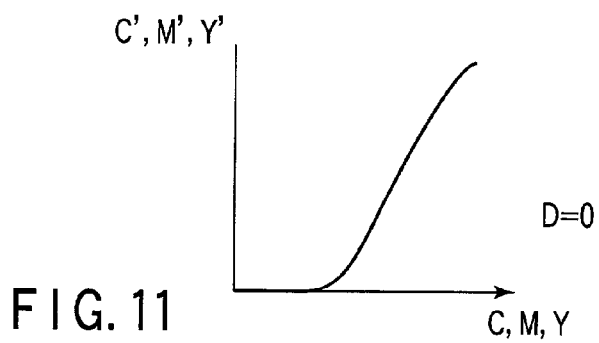
FIG. 11 is a view showing a density curve when a background is removed.

Here, if D=0, the image signal is in a background level. Then, a density curve for removing the background shown in FIG. 11 is selected.

Figure 12:
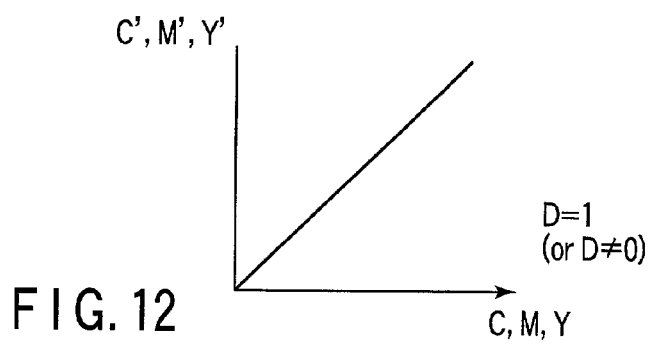
FIG. 12 is a view showing linear density conversion.

If D=1 (or D≠0), the image signal is not in the background level. Then, linear density conversion shown in FIG. 12 is performed.

Figure 13:
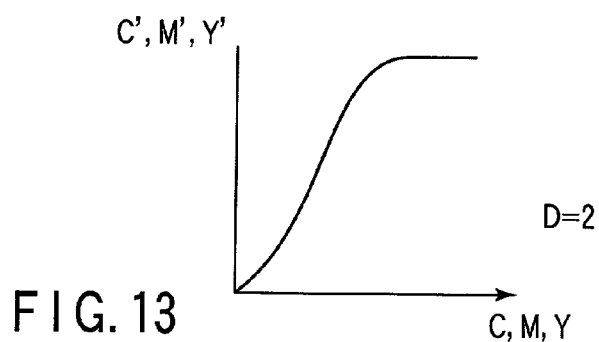
FIG. 13 is a view showing a density curve when portions with relatively high density are emphasized.

If D=2, the image signal is not in the background level. Then, a density curve shown in FIG. 13 that portions with relatively high density are emphasized is selected.

At the blacking section 33, the saturation equivalent signal generating section 331 generates a saturation equivalent signal on the basis of the C, M, Y signal that is output from the density processing section 32 and subjected to density conversion.

Figure 14:
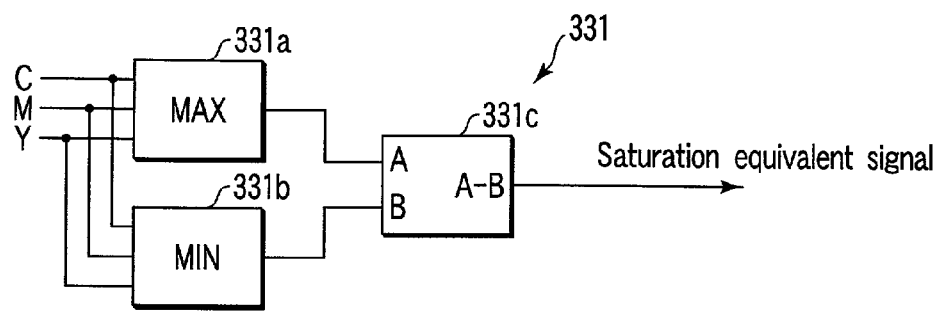
FIG. 14 is a view showing a structure of a saturation equivalent signal generating section.

FIG. 14 shows a structure of the saturation equivalent signal generating section 331. The saturation equivalent signal generating section 331 is configured by a maximum value detector 331a, a minimum value detector 331b and a subtracter 331c. As shown in FIG. 14, the saturation equivalent signal generating section 331 outputs, as a saturation equivalent signal, a difference between the maximum value of C, M and Y signals and the minimum value thereof.

Subsequently, the blacking signal generating section 332 generates a blacking signal K on the basis of the black-and-white signal output from the black-and-white signal generating section 311 and the saturation equivalent signal output from the saturation equivalent signal generating section 331, and outputs the resultant blacking signal to the gradation processing section 34. The blacking signal generating section 332 also generates a blacking substitution signal Kr and outputs the signal to the blacking substitution section 333.

Figure 15:
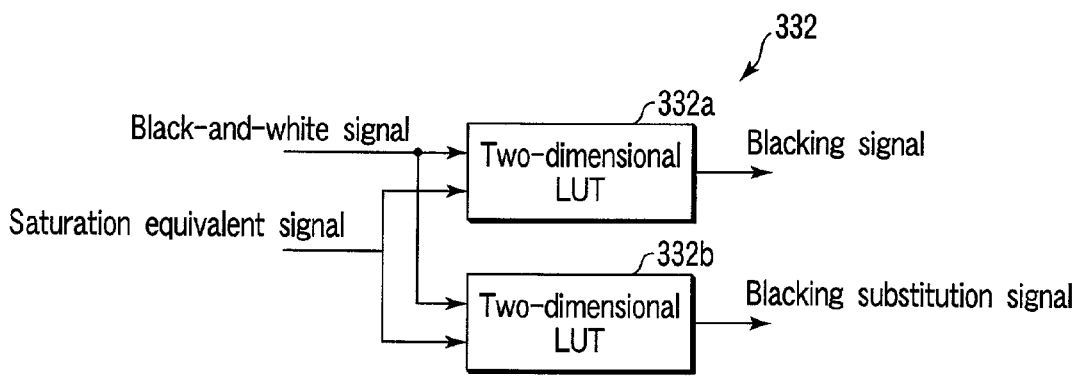
FIG. 15 is a view showing a structure of a blacking signal generating section.

FIG. 15 shows a structure of the blacking signal generating section 332. The blacking signal generating section 332 includes two two-dimensional lookup table (LUT) 332a and 332b. The blacking signal generating section 332 reads out the blacking signal K from the two-dimensional lookup table 332a with the black-and-white signal and the saturation equivalent signal being an address, and outputs the resultant blacking signal to the gradation processing section 34. Further, the blacking signal generating section 332 also reads out the blacking substitution signal Kr from the two-dimensional LUT 332b with the black-and-white signal and the saturation equivalent signal being an address, and outputs the resultant blacking substitution signal to the blacking substitution section 333.

At the blacking substitution section 333, the C, M and Y signals are corrected by the blacking substitution signal Kr outputted from the blacking signal generating section 332. Generally well known UCR system or GCR system may be used as correction system.

An example of blacking substitution using the GCR will be shown hereinafter.

$$C' = 255 \times (C-Kr)/(255-Kr)$$

$$M' = 255 \times (M-Kr)/(255-Kr)$$

$$Y' = 255 \times (Y-Kr)/(255-Kr)$$

The gradation processing section 34 performs γ correction and screen processing for the C, M, Y and K signals (i.e., C', M', Y' and K') output from the blacking section 33, and supplies the resultant signals to the printer section 4. At the gradation processing section 34, the C signal is subjected to the γ correction and the screen processing at the gradation processing section 34c. The M signal is subjected to the γ correction and the screen processing at the gradation processing section 34m. The Y signal is subjected to the γ correction and the screen processing at the gradation processing section 34y, and the K signal is subjected to the γ correction and the screen processing at the gradation processing section 34k.

As described above, in accordance with the embodiment of the present invention, when a low saturation image signal is input, a black-and-white signal is color-converted by the color conversion section 31 according to the present invention and the converted signal is output. Thus, stable gray reproduction can be performed. At this time, as the black-and-white signal is generated on the basis of an output of luminance signal (Y) from the 4-line color CCD sensor 201, the gray signal value has high precision.

Further, as the blacking section 33 of the present invention generates the blacking signal K and the blacking substitution signal Kr on the basis of the black-and-white signal generated from the luminance signal (Y) of the 4-line color CCD sensor 201, dark portions of original image can be precisely blacked.

A high-resolution blacking signal can be obtained by using a high-resolution luminance sensor (i.e., 4-line color CCD sensor). Thus, character reproduction with high quality is possible by reproducing black characters with blacking.

Figure 16:
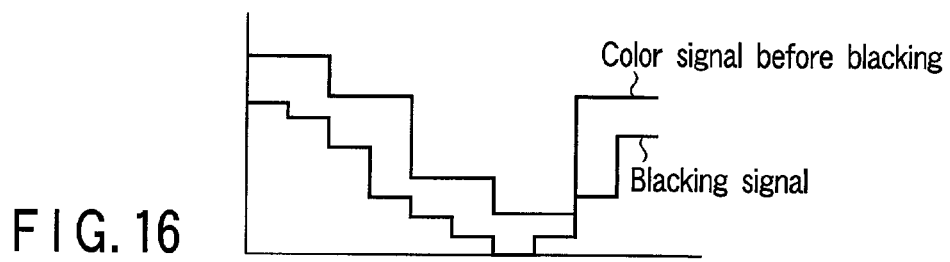
FIG. 16 is a view showing low resolution C, M and Y color signals.
Figure 17:
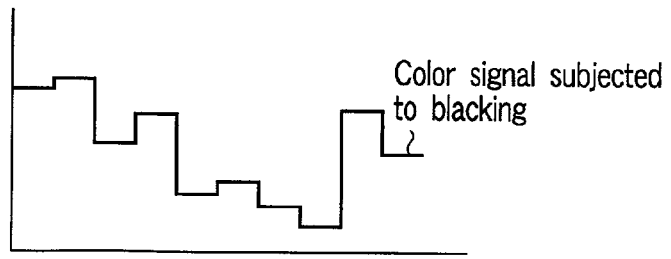
FIG. 17 is a view showing the color signals subsequent to blacking.

As the high-resolution blacking substitution signal can be obtained, a blacking substitution processing utilizing a high resolution blacking substitution signal can be performed for low resolution C, M, Y color signal shown in FIG. 16. By carrying out the blacking substitution processing, an effect of making artificially the color signal high resolution can be obtained as shown in FIG. 17 by the color signal subjected to blacking.

As automatic background removal for the C, M, Y signal, a method in which a background upper limit threshold is detected from a histogram of each of color prints, and a density conversion curve is defined for each color print has been conventionally known.

Figure 18:
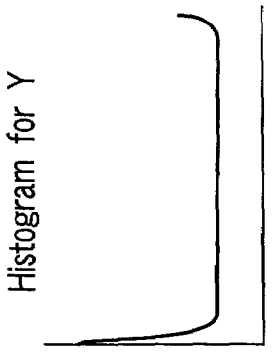
FIG. 18 is a view showing a histogram for the C color signal.
Figure 19:
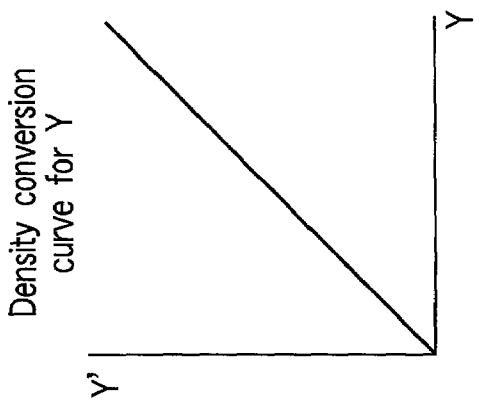
FIG. 19 is a view showing a density conversion curve for the C color signal.

FIG. 18 shows a histogram for the C color signal, and FIG. 19 shows a density conversion curve for the C color signal.

Figure 20:
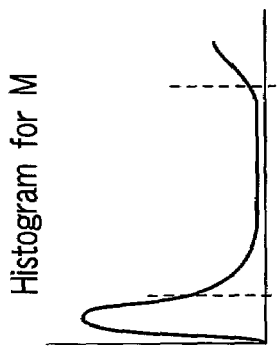
FIG. 20 is a view showing a histogram for the M color signal.
Figure 21:
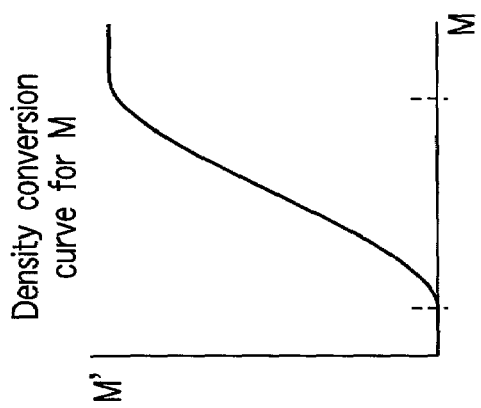
FIG. 21 is a view showing a density conversion curve for the M color signal.

FIG. 20 shows a histogram for the M color signal, and FIG. 21 shows a density conversion curve for the M color signal.

Figure 22:
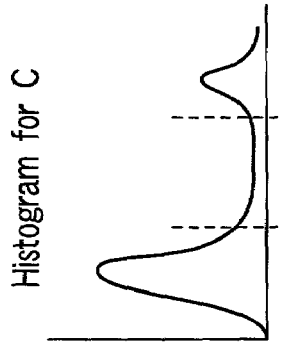
FIG. 22 is a view showing a histogram for the Y color signal.
Figure 23:
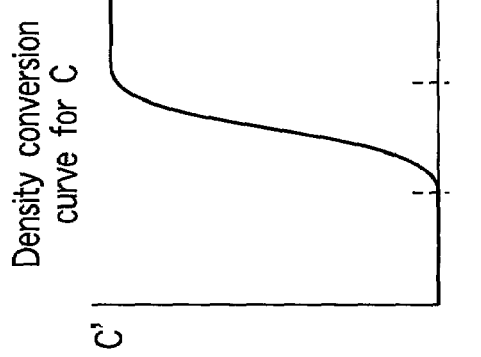
FIG. 23 is a view showing a density conversion curve for the Y color signal.

FIG. 22 shows a histogram for the Y color signal, and FIG. 23 shows a density conversion curve for the Y color signal.

In accordance with such method, however, the processing is performed independently for each of the color prints. Thus, a color print that is assumed as the background and has decreased density and a color print with its density not being decreased exist at the same time.

Accordingly, as shown in FIG. 25, a mixed ratio of C, M and Y color signals shown in FIG. 24 is varied. As a result, there arises a problem in that a hue is improperly changed.

In contrast, in accordance with the density processing section 32 of the present invention, a background upper limit threshold is detected on the basis of a histogram for the black-and-white signal shown in FIG. 26. Then, background determination is performed depending on the black-and-white signal at a time of main scanning, as shown in FIG. 27.

When it is determined by the background determination that the black-and-white signal has low density, the C, M and Y color signals shown in FIG. 28 or 29 are subjected to background removal as shown in FIG. 30. This is because whether or not the background removal is performed is controlled for all C, M and Y prints.

When it is determined by the background determination that the black-and-white signal does not have low density, the C, M and Y color signals shown in FIG. 31 maintain a mixed ratio of C, M and Y as shown in FIG. 32 (i.e., the hue does not vary.). Namely, the hue can be maintained even if the background removal is not performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus which processes a plurality of image signals input from an image reading apparatus for reading an image of an original document, the image reading apparatus comprising a first image reading section formed of a plurality of line CCD sensors with different color characteristics and a second image reading section formed of a single or a plurality of line CCD sensors, wherein said second image reading section is a luminance sensor with high resolution, said image processing apparatus comprising:
   a color conversion section which converts a first image signal read in said first image reading section and represented by a first color space into a second image signal represented by a second color space;
   a generating section which generates a fourth image signal from a third image signal read at said second image reading section;
   a determining section which determines whether or not each of a plurality of pixels has low-saturation color with respect to the first image signal read in said first image reading section;
   a selecting section which selects the fourth image signal generated at said generating section when it is determined as low-saturation color and which selects the second image signal converted at said color conversion section when it is determined as not low saturation; and
   an image processing section which performs an image processing for the fourth or the second image signal selected at the selecting section.

2. An image processing apparatus according to claim 1, wherein the first image signal read at said first image reading section includes a red signal, a green signal and a blue signal.

3. An image processing apparatus according to claim 1, wherein said color conversion section converts red, green and blue signals into cyan, magenta and yellow color signals.

4. An image processing apparatus which processes a plurality of image signals input from an image reading apparatus for reading an image of an original document, the image reading apparatus comprising a first image reading section formed of a plurality of line CCD sensors with different color characteristics and a second image reading section formed of a single or a plurality of line CCD sensors, said image processing apparatus comprising:
   a color conversion section which converts a first image signal read in said first image reading section and represented by a first color space into a second image signal represented by a second color space;
   a generating section which:
      generates a fourth image signal from a third image signal read at said second image reading section; and
      reads out a black-and-white signal from a one-dimensional lookup table with an input of luminance signal being an address;
   a determining section which determines whether or not each of a plurality of pixels has low-saturation color with respect to the first image signal read in said first image reading section;
   a selecting section which selects the fourth image signal generated at said generating section when it is determined as low-saturation color and which selects the second image signal converted at said color conversion section when it is determined as not low saturation; and
   an image processing section which performs an image processing for the fourth or the second image signal selected at the selecting section.

5. An image processing apparatus which processes a plurality of image signals input from an image reading apparatus for reading an image of an original document, the image reading apparatus comprising a first image reading section formed of a plurality of line CCD sensors with different color characteristics and a second image reading section formed of a single or a plurality of line CCD sensors, said image processing apparatus comprising:
   a color conversion section which converts a first image signal read in said first image reading section and represented by a first color space into a second image signal represented by a second color space;
   a generating section which generates a fourth image signal from a third image signal read at said second image reading section;
   a determining section which:
      determines whether or not each of a plurality of pixels has low-saturation color with respect to the first image signal read in said first image reading section; and
      compares a difference between a maximum value of red, green and blue signals serving as the first image signal and a minimum value thereof to a threshold set in advance; and
      determines as low saturation if the difference is smaller than the threshold;
   a selecting section which selects the fourth image signal generated at said generating section when it is determined as low-saturation color and which selects the second image signal converted at said color conversion section when it is determined as not low saturation; and an image processing section which performs an image processing for the fourth or the second image signal selected at the selecting section.

6. An image processing apparatus which processes a plurality of image signals input from an image reading apparatus for reading an image of an original document, the image reading apparatus comprising a first image reading section formed of a plurality of line CCD sensors with different color characteristics and a second image reading section formed of a single or a plurality of line CCD sensors, said image processing apparatus comprising:

a color conversion section which converts a first image signal read at said first image reading section and represented by a first color space into a second image signal represented by a second color space;

an image signal generating section which generates a fourth image signal from a third image signal read at said second image reading section;

a saturation equivalent signal generating section which generates a saturation equivalent signal on the basis of the second image signal converted at said color conversion section; and a blacking signal generating section which generates a blacking signal from the saturation equivalent signal generated at said saturation equivalent signal generating section and the fourth image signal generated at said image signal generating section.

7. An image processing apparatus according to claim 6, wherein said saturation equivalent signal generating section outputs, as the saturation equivalent signal, a difference between a maximum value of the second image signal converted at said color conversion section and a minimum value thereof.

8. An image processing apparatus according to claim 6, wherein said blacking signal generating section reads out a blacking signal from a two-dimensional lookup table set in advance with the fourth image signal and the saturation equivalent signal being an address.

9. An image processing apparatus which processes a plurality of image signals input from an image reading apparatus for reading an image of an original document, the image reading apparatus comprising a first image reading section formed of a plurality of line CCD sensors with different color characteristics and a second image reading section formed of a single or a plurality of line CCD sensors, said image processing apparatus comprising:

a color conversion section which converts a first image signal read at said first image reading section and represented by a first color space into a second image signal represented by a second color space;

an image signal generating section which generates a high-resolution fourth image signal from a high-resolution third image signal read at said second image reading section;

a saturation equivalent signal generating section which generates a saturation equivalent signal on the basis of the second image signal converted at said color conversion section; and a blacking signal generating section which generates a blacking signal from the saturation equivalent signal generated at said saturation equivalent signal generating section and the high-resolution fourth image signal generated at said image signal generating section.

* * * * *